(12) United States Patent
Kumler

(10) Patent No.: US 6,370,602 B1
(45) Date of Patent: Apr. 9, 2002

(54) CONTROL B PROTOCOL FOR POSTSCRIPT™ DEVICES

(75) Inventor: Mark Zeller Kumler, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/253,473

(22) Filed: Feb. 19, 1999

(51) Int. Cl.[7] ............................................. G06F 13/00
(52) U.S. Cl. ............................................ 710/68; 710/33
(58) Field of Search ........................ 710/30–35, 65–68; 282/232; 707/326; 382/232–236; 395/102, 112; 358/403

(56) References Cited

U.S. PATENT DOCUMENTS

| | | | | |
|---|---|---|---|---|
| 5,050,121 A | * | 9/1991 | Vaughan ...................... | 707/542 |
| 5,715,379 A | * | 2/1998 | Pavlovic et al. ............. | 395/112 |
| 5,999,649 A | * | 12/1999 | Nicholson et al. .......... | 382/190 |
| 6,011,905 A | * | 1/2000 | Huttenlocher et al. ...... | 395/102 |
| 6,020,970 A | * | 2/2000 | Erickson et al. ............. | 358/1.1 |
| 6,040,920 A | * | 3/2000 | Ichiriki ........................ | 358/403 |
| 6,192,157 B1 | * | 2/2001 | Prebble ....................... | 382/239 |

OTHER PUBLICATIONS

"Adobe Serial and Parallel Communications Protocols Specification", Adobe Systems, Inc., Nov. 20, 1992.

* cited by examiner

Primary Examiner—Christopher B. Shin
(74) Attorney, Agent, or Firm—Gates & Cooper LLP

(57) ABSTRACT

A Control B protocol for PostScript™ devices allows data to be compressed and transmitted to the PostScript™ device without the need of having bi-directional communications between the sending and receiving device to check for Control B capability or activation. The Control B protocol allows data to be transmitted in binary format, while control functions are represented by quoted character codes, thereby resulting in an efficient use of bandwidth between the devices.

18 Claims, 4 Drawing Sheets

CONTROL B PROTOCOL FOR POSTSCRIPT™ DEVICES

CROSS REFERENCE TO RELATED APPLICATIONS

This application is related to the following co-pending and commonly assigned patent applications:

U.S. patent application Ser. No. 09/253,386, filed on Feb. 19, 1999, by Mark Z. Kumbler, entitled "POSTSCRIPT IMAGE PRINTING USING A DOWNLOADED HANDLER"; and U.S. patent application Ser. No. 09/253,821, filed on Feb. 19, 1999, by Mark Z. Kumbler, entitled "ACCURATE AND RELIABLE PAGE SIZE SELECTION IN A POSTSCRIPT OUTPUT DEVICE";

which applications are incorporated by reference herein.

BACKGROUND OF THE INVENTION

1. Field of the Invention

The present invention relates generally to computer-implemented printing systems, and in particular, to a method for performing a Control B protocol for PostScript™ devices.

2. Description of the Related Art

PostScript™ is a general purpose computer language developed by Adobe Systems, Inc. that has become a standard for device-independent output. PostScript™ is most commonly used for supplying page description information to output devices such as printers and can describe elements including text, graphics, and scanned images.

PostScript™ uses several different protocols to communicate over a serial or parallel link between a computer and a printer (or other devices). The protocols include: standard protocol, binary communications protocol (BCP), and tagged binary communications protocol (TBCP). These protocols are defined in the publication entitled "Adobe Serial and Parallel Communications Protocols Specification", Adobe Systems, Inc., Nov. 20, 1992, which publication is incorporated by reference herein.

The binary communications protocol is a bi-directional method of communicating between the computer and the printer, where neither device is considered to be a slave of the other. Any of the 256 possible 8-bit values may be transmitted as data between the devices, but certain character codes are used for specifying control functions that include flow control, status requests, aborting of jobs, and end-of-file markers.

The control functions include four that are asynchronous with the data stream and one that is synchronous with the data stream. The asynchronous control functions are:

Job status request. The receiving device (e.g., printer) should respond immediately to job status request from the sending device (e.g., computer) by sending appropriate data back to the sending device. The syntax and semantics of the returned information are not specified by the protocol.

Job abort request. The receiving device should respond immediately to job abort control from the sending device by terminating processing of the current job and flushing through the input stream until an end-of-file marker or end-protocol sequence is encountered. The receiving device should proceed at that point with processing the end-of-file or end-protocol in the normal manner.

XON flow control. The device receiving an XON may resume transmitting data that was blocked by a preceding XOFF. The XON and XOFF functions are present to support the well-established XON/XOFF flow control protocol used over asynchronous serial communications channels.

XOFF flow control. The device receiving an XOFF should cease transmitting data as quickly as possible. It may still transmit asynchronous control functions, especially XOFF and XON. Flow control operates independently for each direction of data transmission.

The synchronous control function is:

End-of-file indication.

The following table describes the character codes that represent these control functions.

| ASCII | ASCII Value | Hexadecimal | Control function |
| --- | --- | --- | --- |
| ^A | SOH | 0x0 | Quote character for BCP and TBCP |
| ^C | ETX | 0x03 | Generate an interrupt error |
| ^D | EOT | 0x04 | End-of-file marker |
| ^E | ENQ | 0x05 | Reserved |
| ^Q | DC1 | 0x11 | XON in XON/XOFF flow control |
| ^S | DC3 | 0x13 | XOFF in XON/XOFF flow control |
| ^T | DC4 | 0x14 | Job status request |
| ^\ | ESC | 0x1B | Start of end-protocol for TBCP |

In the above table, the character "^" is also known as "CONTROL".

These control function character codes must be "quoted" to be transmitted as data, so that they are not passed through to the PostScript™ interpreter in the device. Quoting is accomplished by replacing the character code with a two-character sequence comprising a leading character sequence, i.e., ^A or Control A (ASCII hex 0x01), followed by the character associated with the character code XORed with 0x40.

For example, to send a byte with the value 0x14 (^T), the two-byte sequence 0x01 0x54 (^A T) is sent, since ASCII T is the result of XORing ^T with 0x40. Quoting guarantees that whenever any of the character code for the control functions are received by the device, the control function is performed, regardless of whether the preceding character is a ^A. All 8-bit values other than the control function character codes listed in the table above are transmitted by simply sending the value.

After a ^A is received, the next character received that is not one of the control function characters must be the result of XORing one of the control function character codes with 0x40. Receipt of any other character is considered an error in the input. Between the ^A and the XORed character, any number of the control function character codes can appear, except for character codes for control functions that are handled synchronously, i.e., ^D and ^A, which is considered an error.

Use of the binary communications protocol results in a significant performance enhancements. The alternatives for transmitting binary data between devices comprise ASCII hexadecimal for image data (a 1:2 expansion of the data), octal ("\nnn") notation for string data (a 1:4 expansion), or ASCII base-85 encoding (a 4:5 expansion). The binary communications protocol offers a 1:1 transmission for most characters, with a 1:2 expansion for the few control function character codes.

However, the binary communications protocol is generally only used when the printer driver (or host application sending the job to the printer) can determine that it is connected directly to a printer that is enabled to support the protocol. This requires, at least, bi-directional communication between the computer and the printer to determine if this protocol has been enabled. This process is so error-prone that the usual advice to programmers is to never try using this protocol. On the other hand, the alternatives recited above consume a great deal of additional bandwidth.

Therefore, there exists a need in the art for a communications technique that provides the most efficient compression but does not require bi-directional communications between devices.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented method for transmitting data between PostScript™ devices using a Control B protocol. The Control B protocol allows data to be compressed and transmitted to the PostScript™ device without the need of having bi-directional communications between the sending and receiving devices to check for Control B capability or activation. The Control B protocol allows data to be transmitted in binary format, while control functions are represented by quoted character codes, thereby resulting in an efficient use of bandwidth between the devices.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

Hardware Environment

Figure 1A:
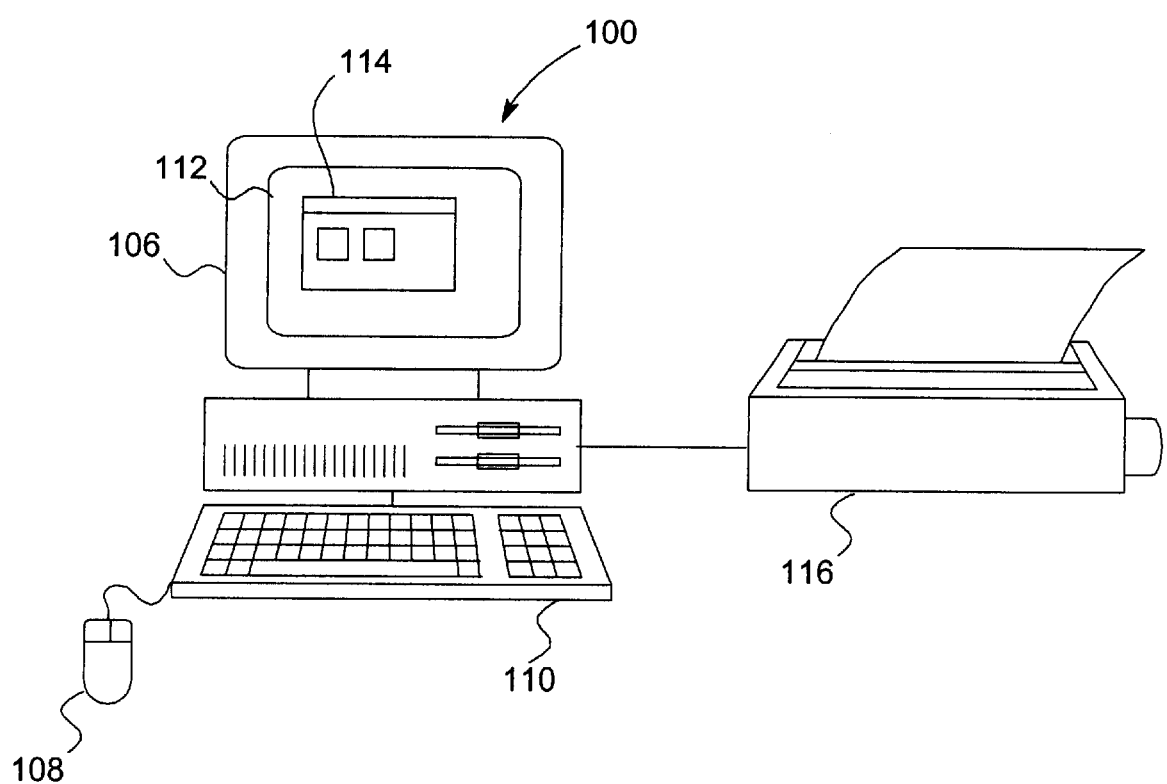
FIGS. 1A and 1B are respective illustrations of a hardware environment for the preferred embodiment of the present invention.
Figure 1B:
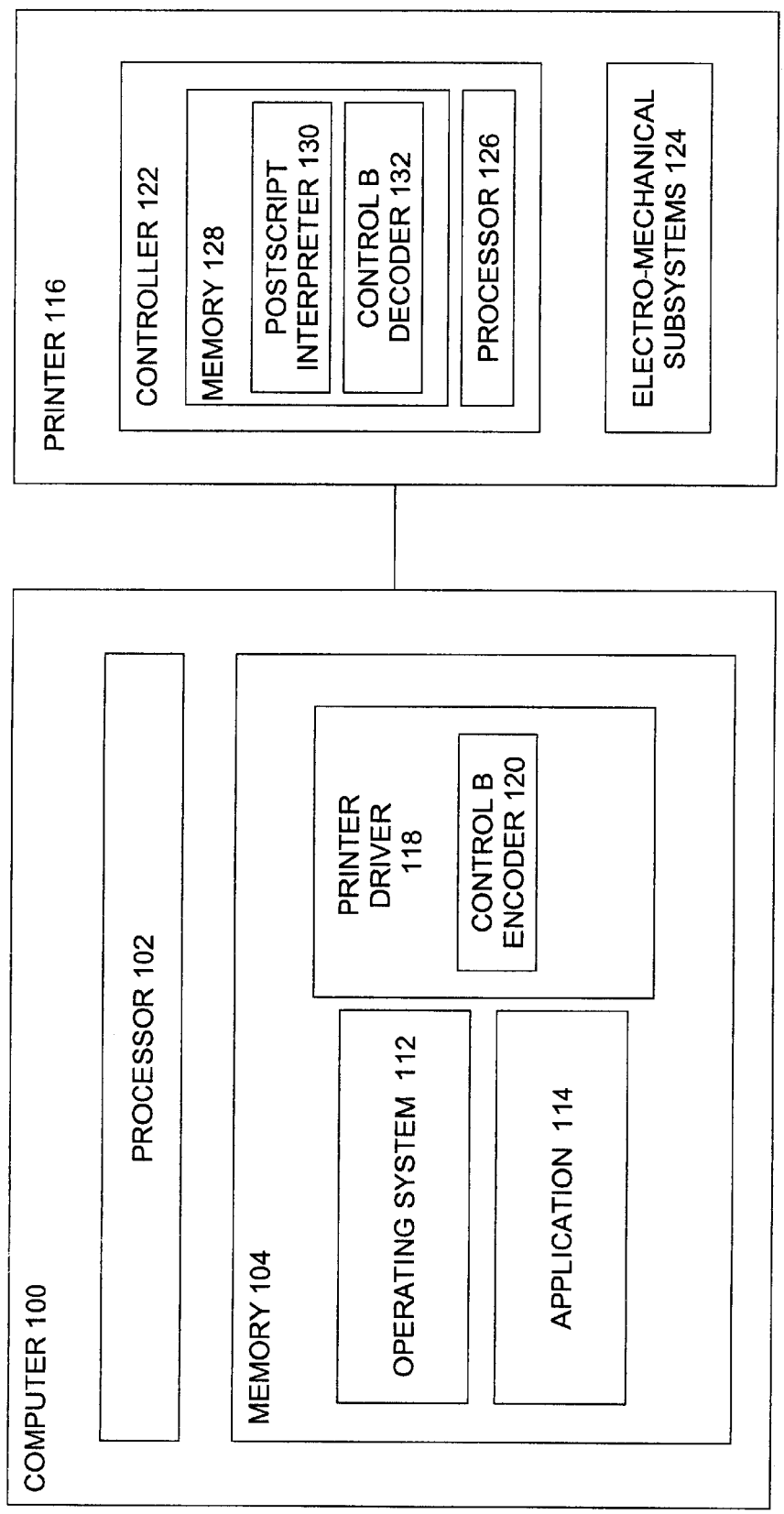

FIGS. 1A and 1B are respective illustrations of a hardware environment for the preferred embodiment of the present invention. The computer 100, generally includes, inter alia, a processor 102, random access memory (RAM) 104, data storage devices (e.g., hard, floppy, and/or CD-ROM disk drives, etc.), data communications devices (e.g., modems, network interfaces, etc.), monitor 106, mouse pointing device 108, and keyboard 110. Those skilled in the art will recognize that any combination of the above components, or any number of different components, peripherals, and other devices, may be used with the computer 100.

The computer 100 usually operates under the control of an operating system 112, which is indicated by the display shown on the monitor 106. The operating system 112 controls the operation of one or more application programs 114, which are indicated by a window shown on the monitor 106. In a preferred embodiment, the application program 114 is a CAD program or other graphics program, although other programs could benefit from the present invention as well.

The application program 114 prints information, such as text, images, etc., on a printer 116 by means of a printer driver 118. In the preferred embodiment, the printer 116 is a PostScript™ printer 116 and is recognized as such by the application program 114. In a preferred embodiment, the printer driver 118 includes a Control B encoder 120, as described in more detail below.

The printer 116 includes both a controller 122 and the necessary electro-mechanical subsystems 124 to effect the desired printing. The controller 122 generally includes a processor 126 and a memory 128. The controller 122 usually operates under the control of a PostScript™ interpreter 130. In a preferred embodiment, the controller 122 also includes a Control B decoder 132, as described in more detail below.

Generally, the operating system 110, application program 112, printer driver 118, Control B encoder 120, PostScript™ interpreter 130, and Control B decoder 132 each comprises instructions and/or data that are embodied in or retrievable from a computer-readable device, medium, or carrier, e.g., a memory, a data storage device, a remote device coupled to the computer via a data communications device, etc. Moreover, these instructions and/or data, when read, executed, and/or interpreted by the computer 100 and/or controller 122 cause the computer 100 and/or controller 122 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention. Those skilled in the art will recognize that the exemplary environment illustrated in FIGS. 1A and 1B are not intended to limit the present invention, and that other alternative hardware environments may be used without departing from the scope of the present invention. Indeed, those skilled in the art will recognize that any combination of the above components, or any number of different components, including computer programs, peripherals, and other devices, may be used to implement the present invention, so long as similar functions are performed thereby.

Control B Compression

As mentioned above, the printer driver 118 must determine whether the printer 116 supports the binary communications protocol, before the binary communications protocol can be used. Further, the binary communications protocol must be enabled within the printer 116 for the printer 116 to receive data using this format. This requires, at least, bi-directional communication between the computer 100 and the printer 116 to determine if this protocol has been enabled by the operating system 112, application program 114, and/or printer driver 118. This process is so error-prone that the usual advice is to never try using this protocol.

The alternative is to transmit binary data between the computer 100 and the printer 116 in one of the other formats, such as ASCII hexadecimal for image data (a 1:2 expansion of the data), octal ("\nnn") notation for string data (a 1:4 expansion), or ASCII base-85 encoding (a 4:5 expansion). Unfortunately, all of these alternatives consume a great deal of additional bandwidth.

The Control B protocol of the present invention includes a decoder 132 in the printer 116 that decodes data for images that have been compressed with the Control B protocol. This protocol allows data to be compressed and transmitted to the printer 116 without having bi-directional communications between the computer 100 and the printer 116 to check for Control A capability or activation.

Following is a table that describes the character codes of the Control B protocol:

| ASCII | ASCII Value | Hexadecimal | Control function |
|---|---|---|---|
| ^A | SOH | 0x01 | Quote character for BCP and TBCP |
| ^B | STX | 0x02 | Quote character for Control B |
| ^C | ETX | 0x03 | Generate an interrupt error |
| ^D | EOT | 0x04 | End-of-file marker |
| ^E | ENQ | 0x05 | Reserved |
| ^Q | DC1 | 0x11 | XON in XON/XOFF flow control |
| ^S | DC3 | 0x13 | XOFF in XON/XOFF flow control |
| ^T | DC4 | 0x14 | Job status request |
| ^\ | ESC | 0x1B | Start of end-protocol for TBCP |

As previously defined, the character "^" in the above table is also known as "CONTROL".

These control function character codes must be "quoted" to be transmitted as data, so that they are interpreted by the decoder 132 in the printer 116 and not passed through to the PostScript™ interpreter in the printer 116. However, they cannot be quoted using the ^A or Control A sequence, without the use of bi-directional communications. In the present invention, an additional quoting is used, thereby replacing the character associated with the control function with a two-character sequence comprising a leading character sequence of ^B or Control B (ASCII hexadecimal 0x02), followed by the character XORed with 0x40.

The Control B protocol transmits the character codes for the control functions as follows:

CONTROL A=CONTROL B followed by A
CONTROL B=CONTROL B followed by B
CONTROL C=CONTROL B followed by C
CONTROL D=CONTROL B followed by D
CONTROL Q=CONTROL B followed by Q
CONTROL S=CONTROL B followed by S
CONTROL T=CONTROL B followed by T
CONTROL \=CONTROL B followed by \

In essence, the present invention provides a "double quoting" function that preserves the compression of the binary communications protocol without the need for establishing bi-directional communications. Note, also, that all 8-bit values other than the character codes for the control functions listed in the above table above are transmitted by simply sending the value.

According to the preferred embodiment of the present invention, after a Control B is received, the next character received that is not one of the characters associated with a control function must be the result of XORing one of the characters with 0x40. Receipt of any other character is considered an error in the input. Between the Control B and the XORed character, any number of the control function characters can appear. When one of the control function characters arrives unquoted, it is discarded.

Use of the Control B protocol results in a significant performance enhancements, similar to those in the binary communications protocol, but without the requirement of bi-directional communications. The Control B protocol offers a 1:1 transmission for most characters, with a 1:2 expansion for the few control function character codes. Thus, the Control B protocol results in approximately 52% compression over standard ASCII hexadecimal encoding (assuming an even distribution of characters).

Encoder Logic

Figure 2:
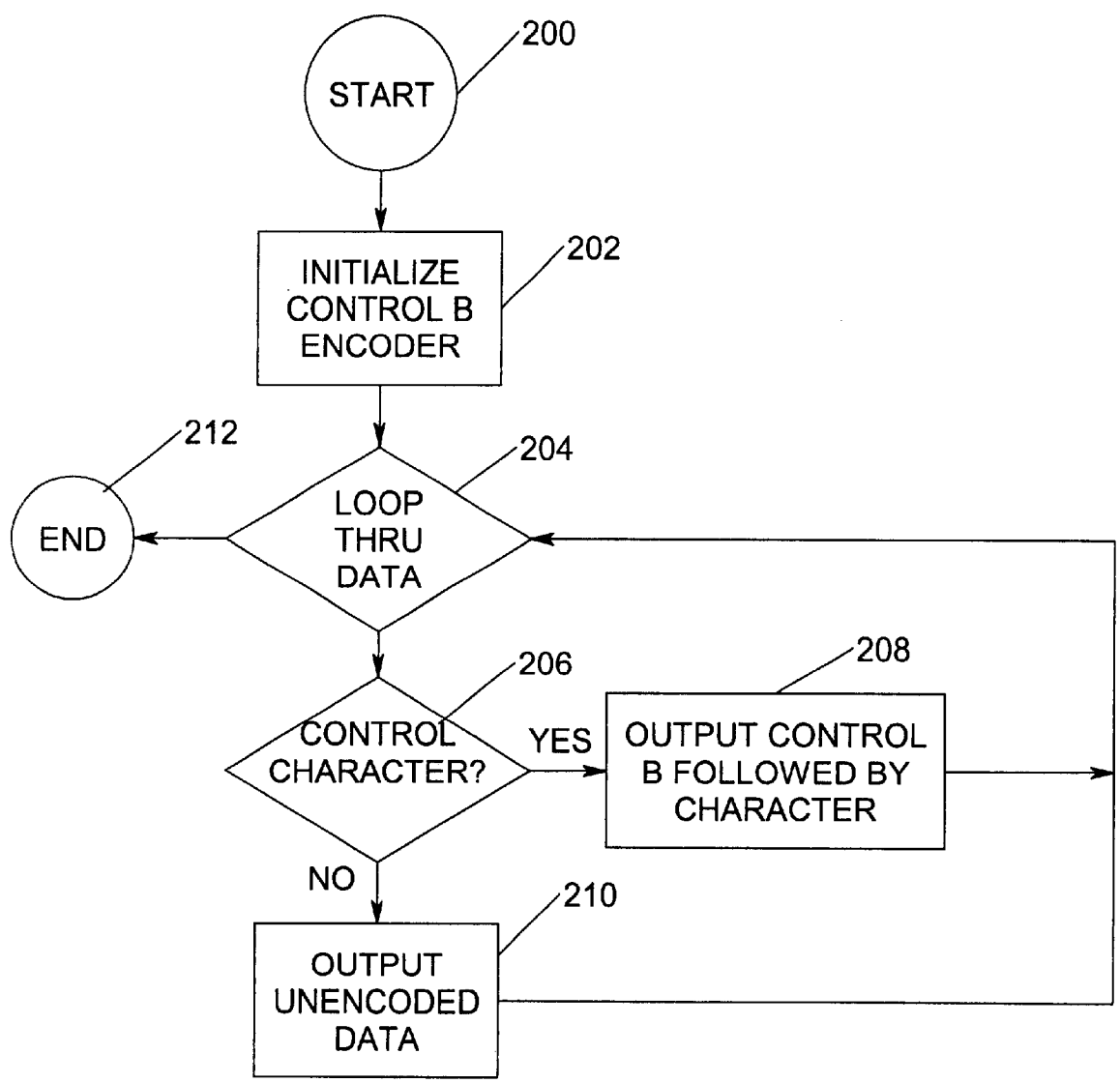
FIG. 2 is a flowchart illustrating the logic performed by a Control B encoder according to the preferred embodiment of the present invention.

FIG. 2 is a flowchart illustrating the logic performed by the Control B encoder 120 according to the preferred embodiment of the present invention.

Block 200 represents the start of the logic.

Block 202 represents the initialization of the Control B encoder 120.

Block 204 is a decision block that represents the Control B encoder 120 looping through the data stream to be sent by the printer driver 118 to the printer 116.

Block 206 is a decision block that represents the Control B encoder 120 determining whether the next character sequence in the data stream is a control function character code. If so, control transfers to Block 208; otherwise, control transfers to Block 210.

Block 208 represents the Control B encoder 120 outputting a Control B followed by the character associated with the control function to the printer 116, as described above. Thereafter, control transfers back to Block 204.

Block 210 represents the Control B encoder 120 outputting unencoded data to the printer 116. Thereafter, control transfers back to Block 204.

Decoder Logic

Figure 3:
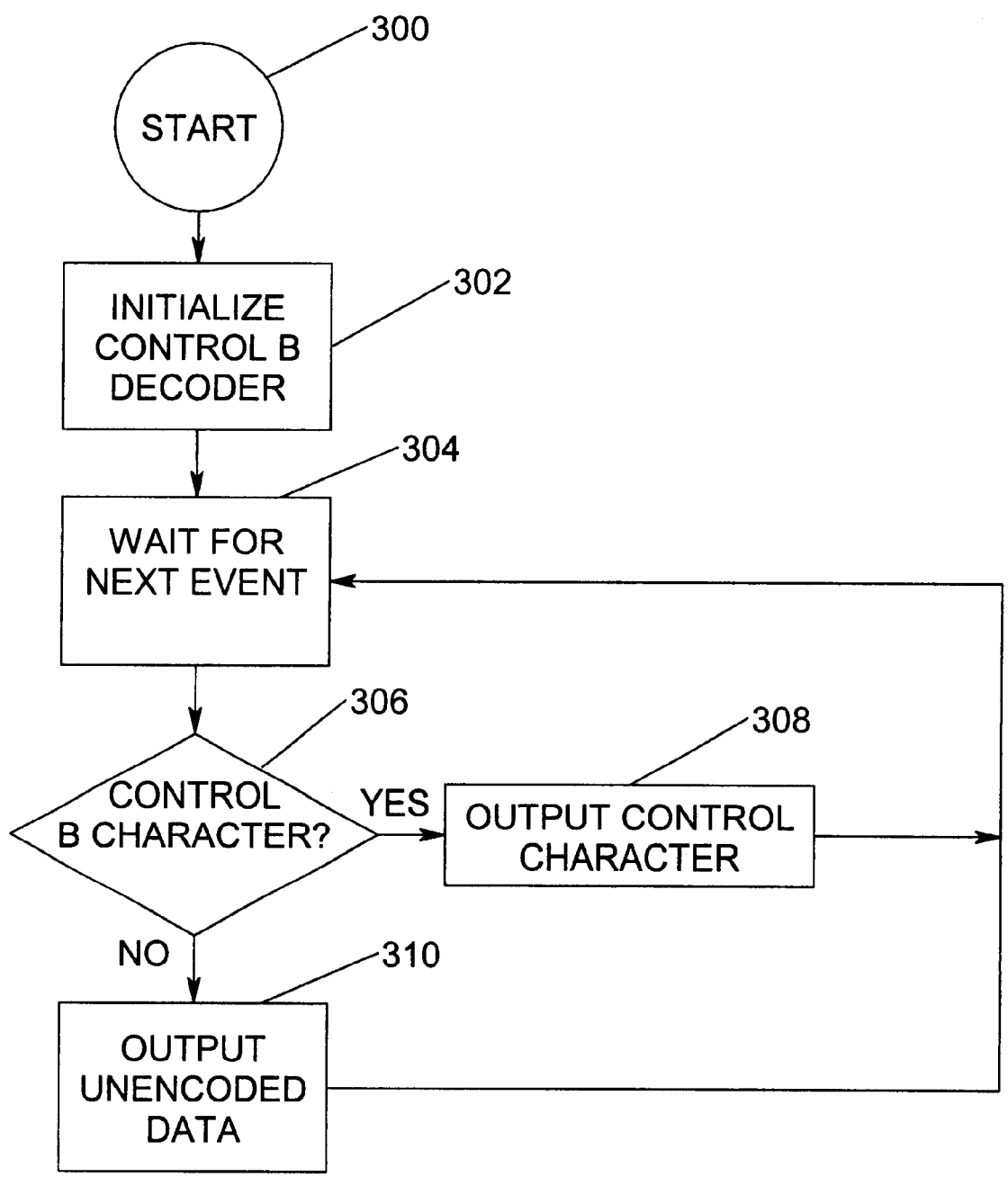
FIG. 3 is a flowchart illustrating the logic performed by a Control B decoder according to the preferred embodiment of the present invention.

FIG. 3 is a flowchart illustrating the logic performed by the Control B decoder 132 according to the preferred embodiment of the present invention.

Block 300 represents the start of the logic.

Block 302 represents the initialization of the Control B decoder 132.

Block 304 is a decision block that represents the Control B decoder 132 waiting for the next event to occur, e.g., waiting for the next character sequence in the data stream to be received by the printer 116 from the computer 100.

Block 306 is a decision block that represents the Control B decoder 132 determining whether the next character sequence in the data stream is a Control B sequence. If so, control transfers to Block 308; otherwise, control transfers to Block 310.

Block 308 represents the Control B decoder 132 outputting a control function character code to the PostScript™ interpreter 130 corresponding to the character following the Control B, as described above. Thereafter, control transfers back to Block 304.

Block 310 represents the Control B decoder 132 outputting unencoded data to the PostScript™ interpreter 130. Thereafter, control transfers back to Block 304.

Conclusion

This concludes the description of the preferred embodiment of the invention. The following describes some alternative embodiments for accomplishing the present invention.

For example, any type of PostScript™ output device, other than printers, could be used with the present invention. In addition, any type of computer program, application, or operating system having a need to use PostScript™ could benefit from the present invention.

In summary, the present invention discloses a discloses a method, apparatus, and article of manufacture for a computer-implemented method for transmitting data between PostScript™ devices using a Control B protocol. The Control B protocol allows data to be compressed and transmitted to the PostScript™ device without the need of having bi-directional communications between the sending and receiving devices to check for Control B capability or activation. The Control B protocol allows data to be transmitted in binary format, while control functions are represented by quoted character codes, thereby resulting in an efficient use of bandwidth between the devices.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for communicating between first and second devices, comprising:
   (a) accepting a data stream into a first device;
   (b) quoting character codes for control functions within the data stream without requiring bi-directional communications between the first and second devices; and
   (c) transmitting the data stream including the quoted character codes to the second device.

2. The method of claim 1, wherein the data stream comprises a PostScript data stream.

3. The method of claim 1, wherein the data stream is transmitted in binary form.

4. The method of claim 1, wherein the quoted character codes for the control functions are interpreted by a decoder in the second device and are not passed through to a data stream interpreter in the second device.

5. The method of claim 1, wherein the quoting step further comprises quoting the character codes for the control functions within the data stream using a Control B character sequence.

6. The method of claim 5, wherein the quoting step further comprises replacing the character codes for the control functions within the data stream with a two-character sequence comprising a leading character sequence of Control B followed by a value representing the character codes.

7. The method of claim 1, wherein the quoting step further comprises double quoting the character codes for the control functions in a manner that preserves compression without the need for establishing bi-directional communications.

8. A method for communicating between first and second devices, comprising:
   (a) accepting a data stream transmitted by the first device into the second device, wherein the character codes for control functions within the data stream have been quoted without requiring bi-directional communications between the first and second devices; and
   (b) decoding the accepting data stream by unquoting the quoted character codes and selectively performing the control functions.

9. The method of claim 8, wherein the data stream comprises a PostScript data stream.

10. The method of claim 8, wherein the data stream is transmitted in binary form.

11. The method of claim 8, wherein the quoted character codes for the control functions are decoded by a decoder in the second device and are not passed through to a data stream interpreter in the second device.

12. The method of claim 8, wherein the quoted character codes for the control functions use a Control B character sequence.

13. The method of claim 12, wherein the quoted character codes for the control functions comprise a two-character sequence comprising a leading character sequence of Control B followed by a value representing the character codes.

14. The method of claim 8, wherein the quoted character codes for the control functions comprise double quoted character codes that preserves compression without the need for establishing bidirectional communications.

15. A system for communicating between first and second devices, comprising:
   (a) a first device connected to a second device;
   (a) means, performed by the first device, for accepting a data stream into a first device, for quoting character codes for control functions within the data stream without requiring bidirectional communications between the first and second devices, and for transmitting the data stream including the quoted character codes to the second device.

16. A system for communicating between first and second devices, comprising:
   (a) a second device connected to a first device;
   (a) means, performed by the second device, for accepting a data stream transmitted by the first device into the second device, wherein the character codes for control functions within the data stream have been quoted without requiring bidirectional communications between the first and second devices, and for decoding the accepting data stream by unquoting the quoted character codes and selectively performing the control functions.

17. An article of manufacture embodying logic for performing a method for communicating between first and second devices, the method comprising:
   (a) accepting a data stream into a first device;
   (b) quoting character codes for control functions within the data stream without requiring bidirectional communications between the first and second devices; and
   (c) transmitting the data stream including the quoted character codes to the second device.

18. An article of manufacture embodying logic for performing a method for communicating between first and second devices, comprising:
   (a) accepting a data stream transmitted by the first device into the second device, wherein the character codes for control functions within the data stream have been quoted without requiring bidirectional communications between the first and second devices; and
   (b) decoding the accepting data stream by unquoting the quoted character codes and selectively performing the control functions.

* * * * *